(12) United States Patent
Walker

(10) Patent No.: US 7,655,158 B2
(45) Date of Patent: Feb. 2, 2010

(54) CORROSION INHIBITOR

(75) Inventor: Michael L. Walker, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 633 days.

(21) Appl. No.: 11/409,789

(22) Filed: Apr. 24, 2006

(65) Prior Publication Data

US 2006/0186380 A1 Aug. 24, 2006

Related U.S. Application Data

(63) Continuation-in-part of application No. 10/393,465, filed on Mar. 20, 2003, now abandoned.

(60) Provisional application No. 60/368,750, filed on Mar. 28, 2002.

(51) Int. Cl.
*C09K 3/00* (2006.01)

(52) U.S. Cl. .................................................. 252/392

(58) Field of Classification Search .................. 252/392
See application file for complete search history.

(56) References Cited

U.S. PATENT DOCUMENTS 3,634,270 A * 1/1972 Engle et al. .................. 510/258
4,493,775 A * 1/1985 Coffey et al. ................ 507/244

* cited by examiner

*Primary Examiner*—Edward J Cain
(74) *Attorney, Agent, or Firm*—Mossman Kumar & Tyler PC

(57) ABSTRACT

The corrosion inhibitor blend of at least one corrosion inhibitor base (which may be a Mannich reaction product), a solvent selected from the group consisting of $C_1$ acids and ester and salt derivatives thereof, and optionally a surfactant, has been found to be effective as a corrosion inhibitor for metals in acid media, particularly fluids containing halogen acids. The corrosion inhibitor has improved performance over similar or identical corrosion inhibitor compositions where an alcohol such as methanol is used as a solvent. Suitable, non-limiting possibilities for the solvent include, but are not necessarily limited to formic acid, formate salts, methyl formate, ethyl formate, benzyl formate, formate salts of amines, inorganic formate, and mixtures thereof.

23 Claims, 1 Drawing Sheet

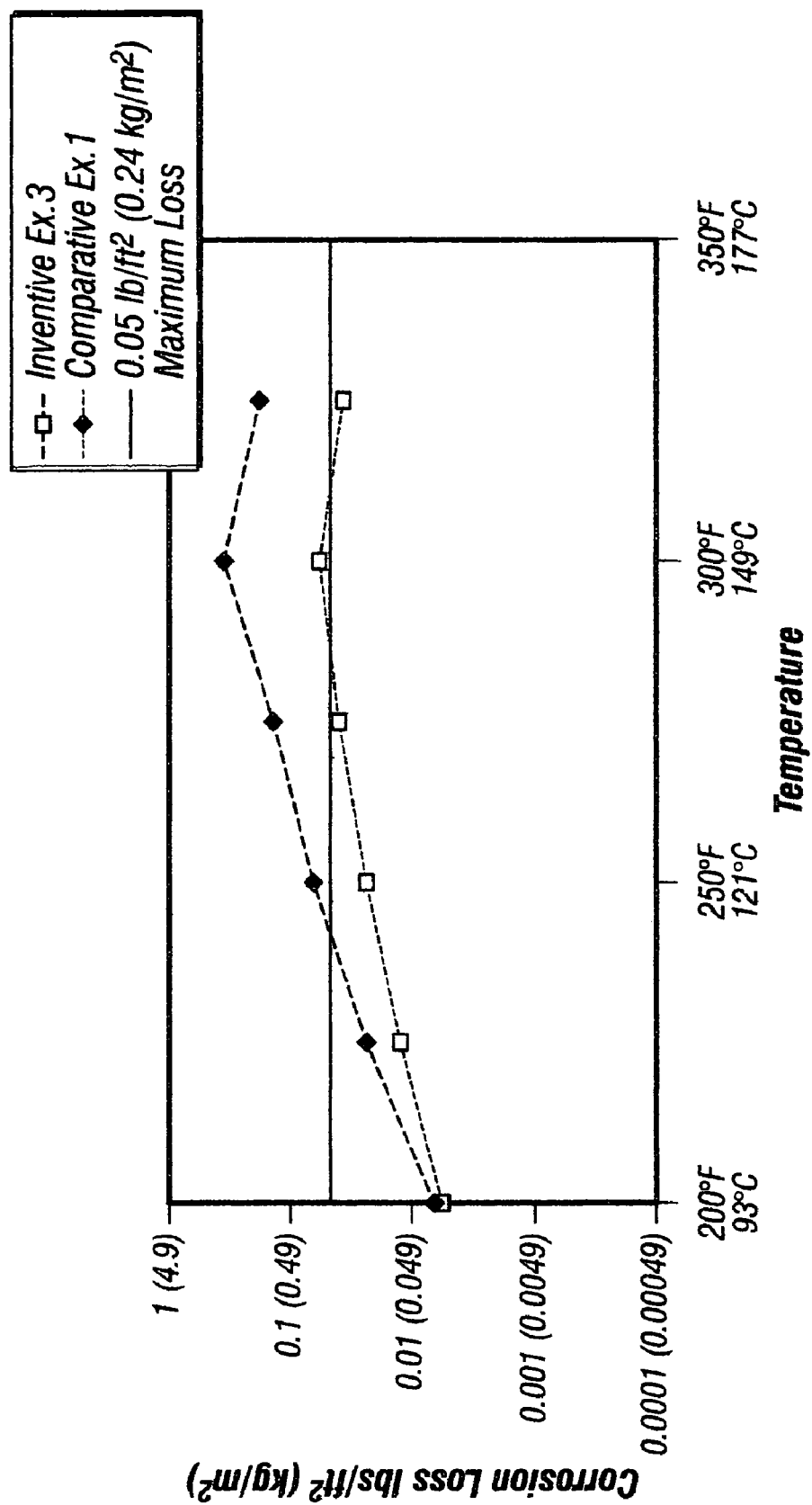

CORROSION INHIBITOR

CROSS-REFERENCE TO RELATED APPLICATIONS

This application is a continuation-in-part of U.S. patent application Ser. No. 10/393,465 filed Mar. 20, 2003, now abandoned which in turn claims the benefit of U.S. Provisional Application No. 60/368,750 filed Mar. 28, 2002.

TECHNICAL FIELD

The invention relates to methods and compositions for inhibiting corrosion of metals, and, in one aspect, more particularly relates to methods and compositions for inhibiting corrosion of metals in acid environments where the acid contains halogen, such as hydrochloric acid, hydrofluoric acid, and the like.

BACKGROUND OF THE INVENTION

It is well known that steel surfaces will corrode in the presence of acid environments. While the rate at which corrosion will occur depends on a number of factors, such as the steel alloy itself, the strength and type of acid, the temperature of the environment, the length of contact, etc., some sort of corrosion invariably occurs. Alloy technology has provided materials to withstand the incidental contact of steel with acid, but the corrosion problem is particularly aggravated when there is no choice but to contact steel with acid, as in the case of chemical processing where acids are employed. In instances where the acid is not required to remain pure and where the contact is inevitable, attention has turned toward providing corrosion inhibitors in the acid medium itself to prevent corrosion of the steel surfaces that it must come into contact with, yet still deliver the acid to its ultimate destination. It would be advantageous if a new corrosion inhibitor were discovered that would be an improvement over the presently known systems. For example, a corrosion inhibitor providing a large corrosion inhibiting effect for a small proportion used would be advantageous.

Specific environments in which an improved corrosion inhibitor would be appreciated include industrial cleaning and hydrocarbon recovery operations. With respect to oil and gas production, it is well known that during the production life of an oil or gas well, the production zone within the well may be chemically treated or otherwise stimulated to enhance the economical production lifetime of the well. A common way of doing this is by acid fracturing or matrix acidizing, whereby a highly acidic solution, generally having a pH of less than about 1, but which may be as high as about 6.9 is injected into the well. Spent acid in return fluids may have a pH of around 3 to 6.9. Because of the acidic nature of the treatment fluid, the production or workover conduit which is utilized in the well in such applications encounters considerable acidic corrosion, in the forms of surface pitting, embrittlement, loss of metal component and the like. Halogen acids are commonly used in these fluids.

In earlier years of producing subterranean wells, the vast majority of production and workover conduits comprised carbon steels. These steels were utilized either temporarily or permanently in the well, and treatment and/or stimulation fluids were introduced through them into the well. Recently, due primarily to the drilling and completion of many subterranean wells through formations which contain high concentrations of corrosive fluids such as hydrogen sulfide, carbon dioxide, brine, and combinations of these constituents, the production and workover conduits for use in the wells have been made of high alloy steels. The high alloy steels include chrome steels, duplex steels, stainless steels, martensitic alloy steels, ferritic alloy steels, austenitic stainless steels, precipitation-hardened stainless steels, high nickel content steels, and the like.

Various corrosion inhibitors are known, to which are added other components, such as intensifiers, surfactants, oil wetting components, and the like.

U.S. Pat. No. 2,758,970 describes derivatives of rosin amines, which are represented by the formula:

where R is a radical selected from the group consisting of abietyl, hydroabietyl, and dehydroabietyl, Y is the group $CH_2R_1$, X is a radical selected from the group consisting of hydrogen and $CH_2R_1$, and $R_1$ represents alpha ketonyl groups. These rosin amines are noted as useful in reducing the rate of corrosion of metals such as magnesium, aluminum and zinc when they are exposed to the action of a corrosive material such as hydrochloric acid.

Further, U.S. Pat. No. 3,077,454 describes compositions for inhibiting corrosion made by combining certain active hydrogen containing compounds with organic ketones having at least one hydrogen atom on the carbon atom alpha to the carbonyl group and an aldehyde selected from the group consisting of aliphatic aldehydes containing from 1 to 16 carbons, and aromatic aldehydes of the benzene series, having no functional groups other than aldehyde groups, and a fatty acid.

Additionally, Mannich base and thiourea inhibitor compositions and methods of inhibiting the acid attack by aqueous hydrofluoric acid on ferrous metal surfaces, and in particular highly reactive ferrous metal surfaces, are described in U.S. Pat. Nos. 3,992,313 and 4,104,303.

There remains a need for new corrosion inhibitor and methods of use therefore which would work in halogen acid environments for a wide variety of metals, particularly iron alloys such as steels.

SUMMARY OF THE INVENTION

There is provided, in one non-limiting embodiment, a corrosion inhibitor having at least one corrosion inhibitor base selected from the group consisting of Mannich reaction products and nitrogen-substituted heterocycles of 6 to 10 members quaternized with at least one alkyl or aryl halide, and at least one first solvent selected from the group consisting of $C_1$ acids and ester derivatives thereof and salts thereof. At least one surfactant may be optionally present. An additional, second solvent may also be optionally present.

The invention also concerns methods of inhibiting the corrosion of metals in the presence of liquids containing at least one halogen acid and the corrosion inhibitor herein. The corrosion of the metal is inhibited as compared with a liquid otherwise identical but absent the corrosion inhibitor. Additionally, the methods and compositions herein include fluids for contacting metal surfaces that have had their corrosion inhibition improved by the corrosion inhibitor.

BRIEF DESCRIPTION OF THE DRAWINGS

The single FIGURE is a chart comparing the corrosion loss in lbs/ft$^2$ (kg/m$^2$) for a corrosion inhibitor herein with a conventional corrosion inhibitor as a function of temperature.

DETAILED DESCRIPTION OF THE INVENTION

It has been discovered that useful halogen acid corrosion inhibitor may be provided by the use of at least one corrosion inhibitor base selected from the group consisting a Mannich reaction product and a nitrogen-substituted heterocycle of 6 to 10 members quaternized with alkyl halides, at least one solvent, and optionally at least one surfactant. The solvent is a $C_1$ acid or derivative thereof, particularly ester derivatives thereof. As will be established, it is important that the solvent be added to or present as a component of the corrosion inhibitor prior to and when the corrosion inhibitor is in turn introduced, added, injected or provided into the liquid, fluid or system that is to be provided with inhibition against corrosion.

In one non-limiting embodiment of the invention, the Mannich reaction products may include, but are not necessarily limited to, the materials of U.S. Pat. Nos. 3,077,454; 5,366,643; and 5,591,381. The products of U.S. Pat. No. 3,077,454 can be made with approximately a 50% yield, and they require the presence of a fatty acid, such as a tall oil fatty acid, in one non-limiting embodiment. The text of this patent is incorporated by reference herein. More specifically, the Mannich reaction product may be the product of reaction of
  (i) one mole of an ammonia derivative having at least one hydrogen attached to nitrogen and having no groups reactive under the conditions of reaction other than hydrogen,
  (ii) from 1.5 to 10 moles of a carbonyl compound having at least one hydrogen atom on the carbon atom adjacent to the carbonyl group,
  (iii) from 2 to 10 moles of an aldehyde different from the carbonyl compound selected from the group consisting of aliphatic aldehydes having from 1 to 16 carbon atoms and aromatic aldehydes of the benzene series and having no functional groups other than aldehyde groups, and
  (iv) from 0.6 to 24 parts by weight based on (1), (2), and (3) of an organic acid having from 1 to 20 carbon atoms
at a temperature of from about 150° F. (66° C.) to about 250° F. (121° C.) for from about 1 to 16 hours.

The nitrogen-substituted heterocycles of 6 to 10 members quaternized with alkyl halides are also commonly referred to as coal tar based quats. These materials are typically quinolines, pyridines and the like quaternized with alkyl and/or aryl halides, where the alkyl or aryl group may range from methyl to benzyl ($C_1$ to $C_6$). Naphthyl quinoline quats are included in this group. Further information may be found with reference to U.S. Pat. No. 2,814,593, incorporated by reference herein, which discusses benzyl chloride quats of quinoline.

The surfactant suitable for use in the method of this invention may be, in one non-limiting embodiment, an esterified alcohol that has been alkoxylated. In a particularly preferred embodiment, the alkoxylation is achieved by reaction with ethylene oxide. Propylene oxide and butylene oxide may also be used, as well as combinations thereof, such as a combination of ethylene oxide and propylene oxide. Suitable alcohols have from about 6 to about 30 carbon atoms, preferably from about 12 to about 22 carbon atoms, and may have more than one hydroxyl group, in one non-limiting embodiment from 1 to 6 hydroxyl groups, and in another non-limiting embodiment from 1 to 3 hydroxyl groups. Particular alcohols expected to be useful in preparing the surfactants for the compositions of this invention include, but are not necessarily limited to, sorbitol, glycerol, ethylene glycol, alkyl-phenols, and mixtures thereof. In a particularly preferred embodiment of the invention, the surfactant is made by esterifying sorbitol with one mole of tall oil and then reacting the product thereof with ethylene oxide until the desired properties are obtained. The desired properties include, but are not necessarily limited to, facilitating, improving and assisting the corrosion inhibitor base and the solvent in contacting any metal in contact with the fluid being inhibited. A suitable amount of ethylene oxide may range from about 3 to about 60 moles, preferably from about 12 to about 40 moles in another non-limiting embodiment of the invention, and from about 3 to about 30 mules in yet another non-limiting embodiment.

It is expected that formic acid will be the solvent of choice, although other materials are expected to function equivalently. These materials include, but are not necessarily limited to ester derivatives of $C_1$ acids, and salts of these acids or ester derivatives. In particular, the solvent may include, but is not necessarily limited to, formate salts, methyl formate, ethyl formate, benzyl formate, formate salts of amines, inorganic formates and mixtures thereof. These inventive solvents unexpectedly and surprisingly give better results than conventional solvents such as unmodified or unreacted alcohols, which in one embodiment of the invention are preferably absent. However, it may be desirable in some embodiments to use conventional solvents as a second solvent such as low carbon number alcohols, e.g. isopropyl alcohol (IPA) for other reasons, including, but not necessarily limited to pour point depression. These conventional solvents may be optionally present in the corrosion inhibitor in proportions from about 0 to about 50 volume % in one non-limiting embodiment, and from 0 to about 30 volume % in an alternate non-limiting embodiment.

As will be demonstrated, the corrosion inhibitor herein should contain and include the solvent at the time the corrosion inhibitor is added, introduced, included or injected into fluid, liquid or system that is to be inhibited against corrosion. Adding the solvent to the fluid, liquid, or system separately or in its own adding or introducing from that of the corrosion inhibitor or having the solvent already present in the fluid, liquid or system has been discovered to be not as effective.

In still another non-limiting embodiment herein, the proportions of the various components in the corrosion inhibitor composition may range from about 10 to about 60 vol. % corrosion inhibitor base, from about 5 to about 50 vol. % surfactant, and from about 3 to about 60 vol. % solvent. In a preferred embodiment of the invention, the corrosion inhibitor composition may range from about 10 to about 50 vol. % corrosion inhibitor base, from about 10 to about 50 vol. % surfactant, and from about 10 to about 50 vol. % solvent. In one particularly preferred embodiment of the invention, the corrosion inhibitor includes about 20% to 40% corrosion inhibitor base, about 20% to 40% surfactant, and about 10% to 40% solvent.

The halogen acid environments, liquids and fluids where the methods and compositions are useful encompass acid environments, liquids and fluids where the acid includes, but is not limited to, hydrochloric acid, hydrofluoric acid, formic acid, acetic acid, and mixtures thereof. The compositions herein have been found to have excellent stability, thus avoiding degradation over time. These corrosion inhibitors will be cost effective and provide excellent corrosion control.

The acid corrosion inhibitor may be combined with, added to, injected into, or introduced to any suitable acidic injection medium, including but not necessarily limited to, such media as downhole acidizing fluids and compositions; 15% and 28% concentrations of HCl, 15-5% acetic acid/HCl blend. It aids corrosion control at elevated temperatures and pressures with the inventive inhibitor.

Other optional ingredients may be used with the corrosion inhibitor herein, and may include, but are not necessarily limited to, any acetylenic compound such as acetylenic alcohols; cinnamaldehyde; a nitrogen compound, such as a quarternary ammonium compound; a source of iodide ions, such as an iodide salt; solvents such as alcohols or ketones; and aromatic hydrocarbons or mixtures thereof, as are known to those skilled in the art. For example, teachings from acid corrosion inhibitors as made and described in U.S. Pat. Nos. 3,514,410; 3,404,094; 3,107,221; 2,993,863; and 3,382,179; may be utilized in accordance with the present invention. All of these patents are hereby incorporated by reference. In one embodiment, the corrosion inhibitor contains at least one acetylenic alcohol having from 3 to 10 carbon atoms. In another non-limiting embodiment herein however, the corrosion inhibitor excludes and/or has an absence of acetylenic alcohol. In a different, non-restrictive version the corrosion inhibitor herein excludes and/or has an absence of a source of iodide ions. For one other non-limiting embodiment herein, the corrosion inhibitor excludes and/or has an absence of any additional, unreacted, or excess formaldehyde; and alternatively has less than about 4 wt % free formaldehyde based on the total components of the corrosion inhibitor, and alternatively less than about 3 wt % free formaldehyde on the same basis.

Examples of acetylenic compounds that may be optionally used include propargyl alcohol (2-propyn-1-ol), hexynol, dimethyl hexynol, diethyl hexynediol, dimethyl hexynediol, ethyl octynol, dimethyl octynediol, methyl butynol, methyl pentynol, ethynyl cyclohexynol, 2-ethyl hexynol, phenyl butynol, and ditertiary acetylenic glycol.

Other acetylenic compounds which can be optionally employed include, but are not limited to, butynediol; 1-ethynylcyclohexanol; 3-methyl-1-nonyn-3-ol; 2-methyl-3-butyn-2-ol; also 1-propyn-3-ol; 1-butyn-3-ol; 1-pentyn-3-ol; 1-heptyn-3-ol; 1-octyn-3-ol; 1-nonyn-3-ol; 1-decyn-3-ol; 1-(2,4,6-trimethyl-3-cyclohexenyl)-3-propyne-1-ol; and in general acetylenic compounds having the general formula:

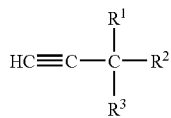

wherein $R^1$ is —H, —OH, or an alkyl radical; $R^2$ is —H, or an alkyl, phenyl, substituted phenyl or hydroxyalkyl radical; and $R^3$ is —H or an alkyl, phenyl, substituted phenyl or hydroxyalkyl radical.

The nitrogen or ammonia compounds that can be optionally employed herein, may include, but are not limited to, those amines having from 1 to 24 carbon atoms in each alkyl moiety as well as the six-membered heterocyclic amines, for example, alkyl pyridines, crude quinolines and mixtures thereof. This includes such amines as ethylamine, diethylamine, triethylamine, propylamine, dipropylamine, tripropylamine, mono-, di- and tripentylamine, mono-, di- and trihexylamine and isomers of these such as isopropylamine, tertiary-butylamine, etc. This also includes alkyl pyridines having from one to five nuclear alkyl substituents per pyridine moiety, such alkyl substituents having from one to 12 carbon atoms, and preferably those having an average of six carbon atoms per pyridine moiety, such as a mixture of high boiling tertiary-nitrogen-heterocyclic compounds, such as HAP (high alkyl pyridines), Reilly 10-20 base and alkyl pyridines H3. Other nitrogen compounds include the crude quinolines having a variety of substituents.

The corrosion inhibitor may also contain a number of other constituents, such as fatty alcohol adducts, nonyl phenol adducts and tallow amine adducts, tall oil adducts, such as surfactants. Oil wetting components, such as heavy aromatic solvents, may also be present. In another non-limiting embodiment, the corrosion inhibitor contains at least one saturated alcohol having from 1 to 5 carbon atoms, and at least one alkyl phenol or alkoxylated alkyl phenol having from 15 to 24 carbon atoms.

In another non-limiting embodiment, the corrosion inhibitor has an absence of a source of molybdate ions. In yet another non-limiting embodiment of the invention, the corrosion inhibitor has an absence of cinnamaldehyde or substituted cinnamaldehyde.

It will be appreciated that the halogen acid corrosion inhibitor herein may be used with conventional corrosion inhibitors as described above and below, and in any application where a steel surface, such as stainless steel, high alloy or other steel, is exposed to an acid environment. While the specific implementation of the methods and compositions herein is described in the context of the oil patch, they may certainly find uses in other applications where it is desirable to reduce corrosion, such as chemical processes that necessarily require the contact of acids with conduits, fittings, and other equipment, such as industrial cleaning applications.

In the implementation of the methods and corrosion inhibitors herein in the production of fluids from subterranean reservoirs, a fluid may be introduced through a high alloy steel member or conduit positioned within the well. The corrosion inhibitor herein is introduced, added, or injected into the fluid. As noted, the fluid may contain an acid, in particular a halogen acid. The fluid may be an acidic injection medium and may include an acid corrosion inhibitor. The invention also encompasses a method of treating a well for enhancement of production within a production zone by introduction or addition into a fluid, particularly one containing an acid, the acid corrosion inhibitor composition herein.

The fluid which is contemplated for use in one non-limiting aspect of the methods and compositions herein for treatment of a subterranean well for enhancement of production will be aqueous based; that is, it will be formed using sea water available at the well location, a brine, tap water or similar fluid. The amount of fluid used for the treatment will vary, of course, from well to well, and will be based upon the particular application at hand, and the amount thereof is not particularly critical to the method. It will be appreciated that one of ordinary skill in the art of corrosion inhibition will be able to adapt the teachings herein to applications outside the realm of oil and gas recovery, such as the area of chemical processing, with only routine experimentation.

The expected treatment fluid in an oil production environment is expected to have as a primary additive an acidic injection medium, which may be any compatible acid, including but not limited to hydrochloric acid, hydrofluoric acid, other mineral acids, other halogen acids, and mixtures thereof. The fluid with the acid injection medium therein should have a pH of no greater than about 6.9. Acidizing fluids can have pH of less than 1 when mixed with produced fluids which may have a pH as high as 6.9.

The treatment fluid also contemplates incorporation of other acid corrosion inhibitors, which typically will be provided in treatment concentrations of from about 1,000 ppm, based upon the weight of the entire treatment fluid to about 60,000 ppm of such weight. Most often, the total amount of corrosion inhibitors will range from about 1,000 to 30,000 ppm. The treatment level of the acid corrosion inhibitor will depend upon the particular physical characteristics of the well, the high alloy steel conduit, temperature and pressure considerations, the selected acidic injection medium, and the like.

In particular, it will be appreciated that the treatment level of the acid corrosion inhibitor of this invention will vary depending upon a wide variety of complex, interrelated parameters including, but not limited to, the particular physical characteristics of the system or well, the nature of the steel, temperature and pressure considerations, the acid and strength thereof in the system, and the like. Nevertheless, to give a sense of the typical proportions that might be used, non-limiting effective amounts of the corrosion inhibitor ranges from about 0.1 to about 10 gpt (gallons of inhibitor per thousand gallons of acid), depending on the acid strength. (This could also be expressed as 0.1 to 10 lpt—liters per thousand liters of acid.) The treatment level also depends upon the temperature and exposure time, with the following being non-limiting, representative examples:

About 1-3 gpt (1-3 lpt) at about ambient to about 200° F. (about 93° C.) in 15% HCl and 6 hours exposure;
About 1-5 gpt (1-5 lpt) at about ambient to about 200° F. (about 93° C.) in 28% HCl and 6 hours exposure;
About 3-10 gpt (3-10 lpt) at about 200 to about 250° (about 93 to about 121° C.) in 15% HCl and 6 hours exposure; and
About 5-15 gpt (5-15 lpt) at about 200 to about 250° (about 93 to about 121° C.) in 28% HCl and 6 hours exposure.

Twenty (20) gpt (20 lpt) of corrosion inhibitor intermediate is commonly used in acid systems at or above about 250° F. (about 121° C.) in one non-limiting embodiment. Proportions of 2-4 gpt (2-4 lpt) may be suitable in some environments (N-80 steel test coupons) at up to about 270° F. (about 132° C.). In another non-limiting embodiment, the amount of corrosion inhibitor based on the liquid being inhibited ranges from about 0.1 to about 22 volume %, preferably from about 3 to about 6 volume %, and in another non-limiting embodiment from about 0.1 to about 3.0 volume %. It will be appreciated that these treatment levels will be different for other mineral acids and other halogen acids.

The invention will be described further in the following illustrative Examples, which are non-limiting and serve only to further illuminate the invention.

TABLE I

Corrosion Inhibitor Comparison

| | | | lb/ft² (kg/m²) | | | |
|---|---|---|---|---|---|---|
| Example | Blend | Solvent | Test 1 | Test 2 | Test 3 | Test 4 |
| Comp. 1 | TFT | MeOH | 0.222 (1.08) | 0.099 (0.483) | 0.264 (1.29) | 0.610 (2.98) |
| Comp. 2 | Formula A | MeOH | 0.277 (1.35) | 0.164 (0.801) | 0.150 (0.732) | 0.553 (2.70) |
| Inv. 3 | Formula B | Formic Acid | 0.056 (0.273) | 0.050 (0.244) | 0.032 (0.156) | 0.120 (0.586) |

TABLE I-continued

Corrosion Inhibitor Comparison

| | | | lb/ft² (kg/m²) | | | |
|---|---|---|---|---|---|---|
| Example | Blend | Solvent | Test 1 | Test 2 | Test 3 | Test 4 |
| Inv. 4 | Formula C | Formic Acid | 0.105 (0.513) | 0.053 (0.259) | 0.025 (0.122) | 0.168 (0.820) |

Notes to Table I:
All tests were conducted on N-80 tubing steel for the conditions described in the Tests using 2.0% inhibitor. The corrosion base material is that described in U.S. Pat. No. 3,077,454, discussed previously.
Test 1: 15% HCl, 6 hrs. at 2000 psi ($1.4 \times 10^4$ kPa) (nitrogen) or 3000 psi ($2.1 \times 10^4$ kPa) (kerosene) 300° F. (149°C.).
Test 2: 15% HCl, 2 hrs. at 2000 psi ($1.4 \times 10^4$ kPa) (nitrogen) or 3000 psi $2.1 \times 10^4$ kPa) (kerosene) 325° F. (163°C.).
Test 3: 28% HCl, 6 hrs. at 2000 psi ($1.4 \times 10^4$ kPa) (nitrogen) or 3000 psi $2.1 \times 10^4$ kPa) (kerosene) 250° F. (121°C.).
Test 4: 28% HCl, 6 hrs. at 2000 psi ($1.4 \times 10^4$ kPa) (nitrogen) or 3000 psi $2.1 \times 10^4$ kPa) (kerosene) 275° F. (135°C.).
TFT is a conventional acetylenic alcohol containing inhibitor corrosion inhibitor of known performance containing about 30 vol. % methanol solvent.
Formula A and Formula B are identical except that formula A use methanol as solvent and is offered as a comparison to formula B which is an example of the invention using formic acid solvent.

It will be appreciated that the inventive corrosion inhibitor of Example 3 gives noticeably improved corrosion inhibition as contrasted with the comparative Examples 1 and 2. For instance, the 0.056 lb/ft² (0.273 kg/m²) result for Test 1 of Example 3 is about five times better than the 0.222 lb/ft² (1.08 kg/m²) of Example 1 or the 0.277 lb/ft₂ (1.35 kg/m²) of Example 2. Similar comparisons can be made for the other Tests. The inventive corrosion inhibitor is consistently better for all Tests. Formula C of Inventive Example 4 was similar to Formula B of Inventive Example 3 except that a surfactant was not used. With the exception of Test 1, the results are comparable to Example 3. It is surprising and unexpected that the addition or inclusion or introduction of an acid, such as formic acid, and ester derivatives thereof, within the corrosion inhibitor prior to adding, injection or introduction to the environment would reduce corrosion in the HCl environment of these Examples.

EXAMPLE 5

The corrosion loss of corrosion inhibitors of Inventive Example 3 and Comparative Example 1 are compared in the Figure chart as a function of temperature. It should be remembered that the corrosion loss scale of the y-axis is a logarithmic scale. This data, presented below in Table ll, was collected using N-80 tubing steel in 15% HCl. It may be seen that the corrosion inhibitor of Inventive Example 3 far outperforms that of Comparative Example 1.

TABLE II

Comparison of Corrosion Inhibitors of Inventive
Example 3 with Comparative Example 1 on N-80 in 15% HCl

| | Inventive Example 3 Corrosion Loss | | Comparative Example 1 Corrosion Loss | |
|---|---|---|---|---|
| Temperature ° F. (° C.) | lbs/ft² | kg/m² | lbs/ft² | kg/m² |
| 200 (93) | 0.006 | 0.029 | 0.007 | 0.034 |
| 225 (107) | 0.013 | 0.063 | 0.023 | 0.112 |
| 250 (121) | 0.023 | 0.112 | 0.065 | 0.317 |
| 275 (135) | 0.039 | 0.190 | 0.140 | 0.683 |

TABLE II-continued

Comparison of Corrosion Inhibitors of Inventive
Example 3 with Comparative Example 1 on N-80 in 15% HCl

| Temperature | Inventive Example 3 Corrosion Loss | | Comparative Example 1 Corrosion Loss | |
|---|---|---|---|---|
| °F. (°C.) | lbs/ft² | kg/m² | lbs/ft² | kg/m² |
| 300 (149) | 0.061 | 0.298 | 0.373 | 1.820 |
| 325 (163) | 0.037 | 0.181 | 0.187 | 0.913 |

EXAMPLES 6-9

Blends D and E were used in Examples 6-9, the results of which are presented in Table III. Blend D is a blend of active corrosive inhibiting materials and dispersing agents in a non active solvent (methanol)—a closest comparative blend to an inventive embodiment. Blend E is the same blend of active corrosive inhibiting materials and dispersing agents of Blend D where formic acid replaced the methanol—and represents one embodiment of the corrosion inhibitor composition herein.

Blends D and E contain the same dispersing agents (surfactants) as those used in Formulae A and B of Examples 1 and 3 of Table 1 above, which surfactants fall within the surfactant definition herein.

The Mannich reaction product corrosion inhibitor base used in Blends D and E herein was the same as that in Formulae A, B, and C of Examples 2, 3, and 4, respectively, of Table 1 noted above, and as described in U.S. Pat. No. 3,077,454 discussed previously. The Mannich reaction product, formic acid and dispersing agents (surfactants) are the same for both Blends D and E.

To insure tests were comparing the methods of addition of the formic acid to the stimulation fluid, and not test the absence or the presence of formic acid in the system, the number of moles of formic acid in each acidic fluid tested were the same. Thus, formic acid was added separately to the test acid fluid in which the inhibitor without formic acid was blended: Blend D. Addition of Blend E de facto adds about 0.5 wt % formic acid as a consequence of the composition of Blend E: it contains about 25 wt % formic acid in its make up, and was used at 2 wt % in the test acidic fluid. Thus, these fluids had about 0.5% w/w in its final assembly before testing at temperature.

Thus, the acid systems used were 15 wt % HCl and 28 wt % HCl each with 0.5 wt % formic acid added to the acid mixture and inhibited with comparative Blend D.

The above acid systems were compared to 15 wt % HCl and 28 wt % HCl with no other additive, but inhibited with inventive Blend E. The amount of formic acid carried to the acid system by inventive Blend E is 0.5 wt %.

Thus, each acid system contains the same corrosion inhibitor active materials and 0.5 wt % formic acid. The difference between the comparative (Blend D) and inventive (Blend E) compositions is how the formic acid is distributed.

The corrosion tests were conducted with N-80 steel at 3000 psig test pressure. The results are presented in Table III.

TABLE III

Comparison of Corrosion Inhibition Where Same
Amount of Formic Acid Delivered in Two Different Ways

| Ex. | Acid Type, wt % | Temp., °F. | Time, hrs | Corrosion loss in lbs/ft² with Blend D and 0.5 wt % formic (comp.) | Corrosion loss in lbs/ft² with Blend E no formic (inv.) |
|---|---|---|---|---|---|
| 6 | 15% HCl | 300 | 6 | 0.113 | 0.074 |
| 7 | 15% HCl | 325 | 2 | 0.054 | 0.048 |
| 8 | 28% HCl | 250 | 6 | 0.037 | 0.030 |
| 9 | 28% HCl | 275 | 6 | 0.154 | 0.101 |

Table III shows that for each Example, the corrosion loss for inventive Blend E was less than the corrosion loss for comparative Blend D in each instance; and that a corrosion inhibitor blend comprising formic acid (and other C1 equivalents), then introducing the corrosion inhibitor to the liquid medium is a better way to achieve the desired result of improved performance.

Many modifications may be made in the present invention without departing from the spirit and scope thereof that are defined only by the appended claims. For example, certain components per se, or combinations of components thereof other than those specifically set out herein may be found by one of routine skill in the art to be particularly advantageous, e.g. different combinations of corrosion inhibitor bases with certain solvents and/or different combinations of surfactants. Additionally, certain proportions of reactants may produce corrosion inhibitors having particular efficacy.

I claim:

1. A corrosion inhibitor consisting essentially of:
    a. at least one Mannich reaction product corrosion inhibitor base; and
    b. from about 0.1 to about 60.0 volume % of at least one first solvent selected from the group consisting of $C_1$ acids and ester derivatives thereof and salts thereof.

2. The corrosion inhibitor of claim 1 where the Mannich reaction product comprises the product of reaction of
    (i) one mole of an ammonia derivative having at least one hydrogen attached to nitrogen and having no groups reactive under the conditions of reaction other than hydrogen,
    (ii) from 1.5 to 10 moles of a carbonyl compound having at least one hydrogen atom on the carbon atom adjacent to the carbonyl group,
    (iii) from 2 to 10 moles of an aldehyde different from the carbonyl compound, selected from the group consisting of aliphatic aldehydes having from 1 to 16 carbon atoms and aromatic aldehydes of the benzene series and having no functional groups other than aldehyde groups, and
    (iv) from 0.6 to 24 parts by weight based on (1), (2), and (3) of an organic acid having from 1 to 20 carbon atoms
at a temperature of from about 150° F. (66° C.) to about 250° F. (121° C.) for from about 1 to 16 hours.

3. The corrosion inhibitor of claim 1 where the at least one first solvent is selected from the group consisting of formic acid, formate salts, methyl formate, ethyl formate, benzyl formate, formate salts of amines, inorganic formates, and mixtures thereof.

4. The corrosion inhibitor of claim 1 where the components are present in the following proportions:
    a. 10 to 60 volume % corrosion inhibitor base; and
    b. 3 to 50 volume % solvent, based on the total corrosion inhibitor.

5. The corrosion inhibitor of claim 1 further comprising a second solvent different from the first solvent present up to about 50 volume %, based on the total corrosion inhibitor.

6. A corrosion inhibitor consisting essentially of:
   a. a Mannich reaction product
   b. at least one first solvent selected from the group consisting of $C_1$ acids and ester derivatives thereof and salts thereof; and
   c. at least one surfactant.

7. The corrosion inhibitor of claim 6 where the Mannich reaction product comprises the product of reaction of
   (i) one mole of an ammonia derivative having at least one hydrogen attached to nitrogen and having no groups reactive under the conditions of reaction other than hydrogen,
   (ii) from 1.5 to 10 moles of a carbonyl compound having at least one hydrogen atom on the carbon atom adjacent to the carbonyl group,
   (iii) from 2 to 10 moles of an aldehyde different from the carbonyl compound, selected from the group consisting of aliphatic aldehydes having from 1 to 16 carbon atoms and aromatic aldehydes of the benzene series and having no functional groups other than aldehyde groups, and
   (iv) from 0.6 to 24 parts by weight based on (1), (2), and (3) of an organic acid having from 1 to 20 carbon atoms
at a temperature of from about 150° F. (66° C.) to about 250° F. (121° C.) for from about 1 to 16 hours.

8. The corrosion inhibitor of claim 6 where the at least one surfactant is an alcohol or an esterified alcohol that has been alkoxylated.

9. The corrosion inhibitor of claim 8 where the alcohol used to make the at least one surfactant has from about 6 to 30 carbon atoms.

10. The corrosion inhibitor of claim 6 where the at least one first solvent is selected from the group consisting of formic acid, formate salts, methyl formate, ethyl formate, benzyl formate, formate salts of amines, inorganic formates, and mixtures thereof.

11. The corrosion inhibitor of claim 6 where the components are present in the following proportions:
   a. 10 to 60 volume % corrosion inhibitor base;
   b. 3 to 50 volume % solvent; and
   c. 5 to 50 volume % surfactant,
based on the total corrosion inhibitor.

12. A method of inhibiting the corrosion of metals in the presence of a liquid medium containing at least one halogen acid comprising introducing a corrosion inhibitor into the liquid medium where the corrosion inhibitor comprises:
   a. at least one Mannich reaction product corrosion inhibitor base; and
   b. at least one first solvent selected from the group consisting of $C_1$ acids, ester derivatives thereof and salts thereof,
where the amount of corrosion inhibitor introduced into the liquid medium ranges from about 0.1 to about 3.0 volume % in the liquid medium which is to be treated.

13. The method of claim 12 where the corrosion inhibitor comprises at least one Mannich reaction product comprises the product of reaction of
   (i) one mole of an ammonia derivative having at least one hydrogen attached to nitrogen and having no groups reactive under the conditions of reaction other than hydrogen,
   (ii) from 1.5 to 10 moles of a carbonyl compound having at least one hydrogen atom on the carbon atom adjacent to the carbonyl group,
   (iii) from 2 to 10 moles of an aldehyde different from the carbonyl compound, selected from the group consisting of aliphatic aldehydes having from 1 to 16 carbon atoms and aromatic aldehydes of the benzene series and having no functional groups other than aldehyde groups, and
   (iv) from 0.6 to 24 parts by weight based on (1), (2), and (3) of a carboxylic acid having from 1 to 20 carbon atoms
at a temperature of from about 150° F. (66° C.) to about 250° F. (121° C.) for from about 1 to 16 hours.

14. The method of claim 12 where in the corrosion inhibitor, the at least one first solvent is selected from the group consisting of formic acid, formate salts, methyl formate, ethyl formate, benzyl formate, formate salts of amines, inorganic formates, and mixtures thereof.

15. The method of claim 12 where the components of the corrosion inhibitor are present in the following proportions:
   a. 10 to 60 volume % corrosion inhibitor base; and
   b. 3 to 50 volume % solvent,
based on the total corrosion inhibitor.

16. The method of claim 12 where the corrosion inhibitor further comprises a second solvent different from the first solvent, and the second solvent is present up to about 50 volume %, based on the total corrosion inhibitor.

17. A method of inhibiting the corrosion of metals in the presence of a liquid medium containing at least one halogen acid comprising introducing a corrosion inhibitor into the liquid medium where the corrosion inhibitor consists essentially of:
   a. at least one Mannich reaction product corrosion inhibitor base;
   b. at least one first solvent selected from the group consisting of $C_1$ acids, ester derivatives thereof and salts thereof; and
   c. at least one surfactant,
where the amount of corrosion inhibitor introduced into the liquid medium ranges from about 0.1 to about 3.0 volume %.

18. The method of claim 17 where the corrosion inhibitor comprises at least one Mannich reaction product comprises the product of reaction of
   (i) one mole of an ammonia derivative having at least one hydrogen attached to nitrogen and having no groups reactive under the conditions of reaction other than hydrogen,
   (ii) from 1.5 to 10 moles of a carbonyl compound having at least one hydrogen atom on the carbon atom adjacent to the carbonyl group,
   (iii) from 2 to 10 moles of an aldehyde different from the carbonyl compound, selected from the group consisting of aliphatic aldehydes having from 1 to 16 carbon atoms and aromatic aldehydes of the benzene series and having no functional groups other than aldehyde groups, and
   (iv) from 0.6 to 24 parts by weight based on (1), (2), and (3) of a carboxylic acid having from 1 to 20 carbon atoms
at a temperature of from about 150° F. (66° C.) to about 250° F. (121° C.) for from about 1 to 16 hours.

19. The method of claim 17 where in the corrosion inhibitor, the at least one surfactant is an esterified alcohol that has been alkoxylated.

20. The method of claim 19 where in the surfactant, the alcohol used to make the at least one surfactant has from about 6 to 30 carbon atoms.

21. The method of claim 17 where in the corrosion inhibitor, the at least one first solvent is selected from the group consisting of formic acid, formate salts, methyl formate, ethyl formate, benzyl formate, formate salts of amines, inorganic formates, and mixtures thereof.

22. The method of claim 17 where the components of the corrosion inhibitor are present in the following proportions:
  a. 10 to 60 volume % corrosion inhibitor base;
  b. 3 to 50 volume % solvent;
  c. 5 to 50 vol. % surfactant; and
based on the total corrosion inhibitor.

23. The method of claim 17 where the corrosion inhibitor further comprises a second solvent different from the first solvent, and the second solvent is present up to about 50 volume %, based on the total corrosion inhibitor.

* * * * *